Oct. 19, 1943.   H. D. STECHER   2,332,355
TUBE COUPLING AND METHOD OF MAKING SAME
Filed Nov. 18, 1941   2 Sheets-Sheet 1
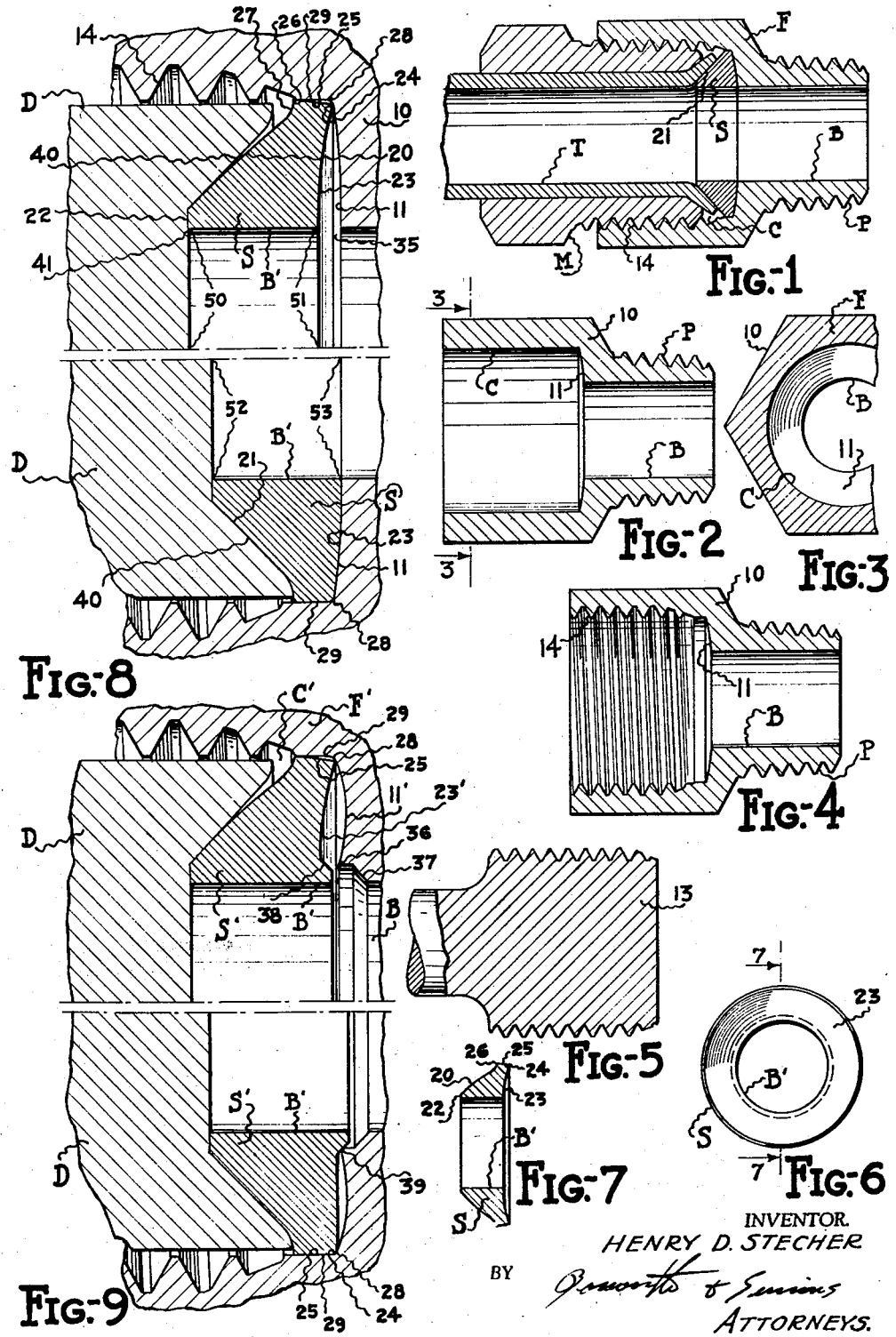
INVENTOR.
HENRY D. STECHER
BY
ATTORNEYS.

Oct. 19, 1943.   H. D. STECHER   2,332,355
TUBE COUPLING AND METHOD OF MAKING SAME
Filed Nov. 18, 1941   2 Sheets-Sheet 2
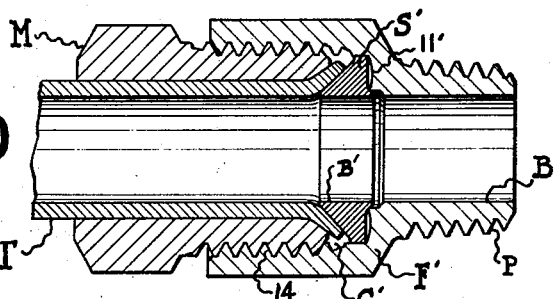
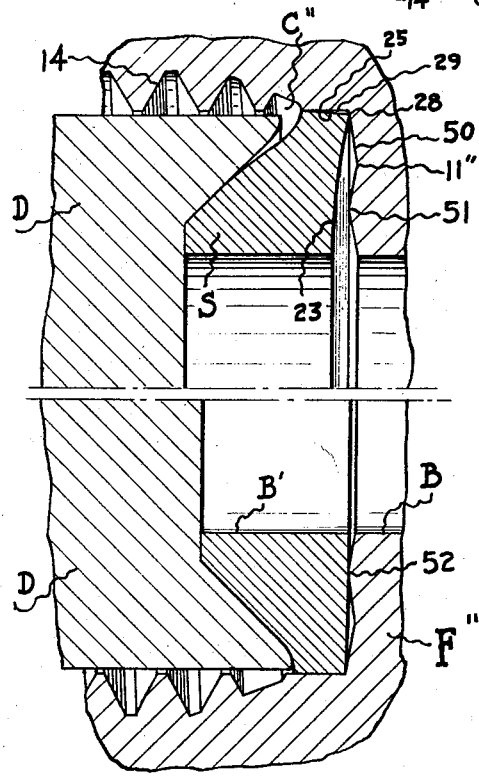
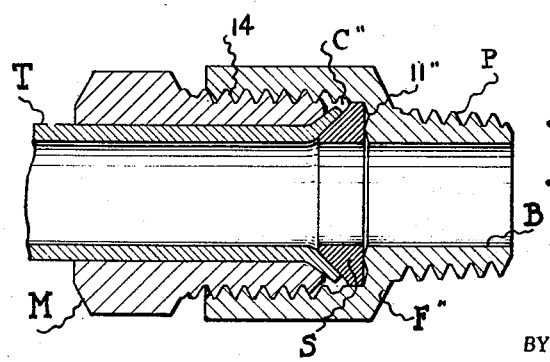
INVENTOR.
HENRY D. STECHER
BY
ATTORNEYS.

Patented Oct. 19, 1943

2,332,355

UNITED STATES PATENT OFFICE 2,332,355

TUBE COUPLING AND METHOD OF MAKING SAME

Henry D. Stecher, Lakewood, Ohio, assignor to The Weatherhead Company, Cleveland, Ohio, a corporation of Ohio Application November 18, 1941, Serial No. 419,587

7 Claims. (Cl. 29—157)

This invention relates to tube couplings of the inverted seat type, such as illustrated in the Weatherhead Patent No. 1,733,925, and to a method of making such a coupling and more particularly the female member thereof.

In the manufacture of such couplings a problem long standing in the art had lain in the tapping of the threads in the main female cavity adjacent the inverted seat which rises from the bottom thereof. Forming this seat in the bottom of the female cavity in and of itself presents a problem in that the cutting tools of such an operation must be shaped with re-entrant angles and sometimes relatively weakly supported cutting edges. This leads to compromises between the most desired shapes and materials on the one hand and the most economical form of tool and machining operation on the other hand. Particularly where metals difficult to machine are employed, the aggravation of this phase of the problem is increased. After the inverted conical seat has been cut and formed in the bottom of the cavity, threading the walls radially adjacent thereto, i. e., substantially all the way to the bottom of the cavity adjacent the conical seat, has required the use of hollow taps with recessed forward ends, relatively insufficient structural support for the leading cutters, and flatter chamfers on the leading ends of the taps. The former expedients have led to tap failures, imperfect threads and the like and lower cutting speeds to say nothing of the broken taps and the wastage of spoiled or damaged products, particularly where materials more difficult to machine were sought to be used in the coupling bodies. The latter expedient leaves a greater number of only partially formed threads adjacent the inverted seat, which approaches the undesirability of leaving this portion of the cavity entirely unthreaded. As taught in the Weatherhead patent first above mentioned the practice of leaving the bottom of the female cavity unthreaded adjacent the inverted conical seat militates against compactness and economy of material in the coupling in that it extends the length of both the male and female coupling members.

It is among the objects of my invention to provide a coupling of this inverted seat type in which the threading or tapping of the female cavity may be carried out in the absence of the inverted seat. A further object is to provide and secure within the female body portion an inverted seat in an economical and efficient way, and in which a fluid-tight bond between the seat and the body of the coupling member may be insured. A further object is to provide a method of making a coupling member of the inverted seat type, which may be used with a wide variety of materials including those of the more difficult machining characteristics without regard to the welding or brazing characteristics of such materials, and with a freedom of choice of materials such that different kinds of materials, when desired, may be employed for the body portion of the coupling on the one hand and in the seat portion on the other hand.

Other objects will appear from the following description of a preferred and certain modified forms of my coupling and method herein described and claimed, reference being had to the accompanying drawings in which Figure 1 is a longitudinal sectional view of a complete coupling member engaging the flared end of the tube to be coupled; Figure 2 is a longitudinal sectional view of an illustrative body portion of the female member at the point preceding the threading of the cavity thereof; Figure 3 is an end view of the body member shown in Figure 2 taken along the line 3—3 therein; Figure 4 is a longitudinal sectional view of the same body member shown in Figure 3 after the tapping operation of the main cavity has been performed; Figure 5 is an illustrative sectional view of the tap which may be used to form threads in the main cavity of the body as shown in Figure 4; Figure 6 is an end view of a separate seat member; Figure 7 is a section of the seat member taken from the line 7—7 of Figure 6; Figure 8 is a greatly enlarged pair of views, broken along spaced center lines, to show the steps of inserting and securing the seat member into the bottom of the main cavity of the female body member; Figure 9 is a similar double sectional view along spaced center lines showing a modified form of seat and body member construction; Figure 10 is a longitudinal sectional view of a complete coupling employing the form of seat shown in Figure 9; Figure 11 is another enlarged pair of broken sectional views along spaced centerlines showing the steps of inserting and securing a modified form of seat in a modified body; Figure 12 is a longitudinal sectional view similar to Figs. 1 and 10, employing the seat and body of Figure 11.

A complete coupling to which my invention is directed generally is shown in Figure 1, which comprises the female member F having an inverted conical seat S positioned in the bottom of the main threaded cavity C into which enters the tube T, the flared end of which rests on the seat S and is forcibly engaged therewith by a correspondingly formed end of the male member M, which has threaded engagement with the female member. This general relationship between the several parts may be similar to that shown in the Weatherhead patent first above mentioned. A characteristic of this general type of coupling is its compactness, in that the male member is threaded substantially all the way to its forward end, and the female member is threaded substantially all the way to the bottom of the cavity C adjacent the seat S. Externally the male member M and the female member F may have a hexagonal or other non-circular configuration, see Figure 3, for convenient engagement by wrenches or other tools to facilitate their forceful grip upon the flared end of the tube.

Externally the female member is, as illustrated, also shown to have a pipe threaded extremity P through which the central bore B passes, which is substantially coextensive with a similar bore through the seat S and substantially coextensive with the axis of the tube to be coupled. The external pipe threaded characteristic of this portion of the female member is merely illustrative of a convenient and widely used form through which the coupling can be attached to another instrumentality. It will be appreciated that this portion of the female member may assume any convenient form or characteristic, whether of straight or elbow construction, internally or externally threaded or otherwise, the nature and uses of which are well understood in the art and do not, per se, form a part of this invention.

The male member M may have, within the precepts of utility with this invention, external male threads running to the forward or tube engaging end thereof of substantially full depth all the way to the end, preferably chamfered only to facilitate initial engagement of the threads, or may be chamfered to substantially correspond with the chamfer of the female threads as particularly taught in the said Weatherhead patent where that may be desired.

The female member F preferably comprises a body portion 10, Figures 2, 3 and 4, and a separate seat S, see Figures 6 and 7. In Figure 2 the body portion of the female member is shown to have been formed to the point of having the main cavity C drilled or bored out to tap drill diameter with a substantially flat or slightly dished bottom 11 and a central coaxial bore B. As mentioned above, the body member at this stage of its formation may also have external pipe threads P and may be formed of hex stock as shown in Figure 3 for purposes above described. As shown in Figure 2 it will be seen that the bottom 11 of the cavity C is so clear of obstruction that a full bodied tap 13 may be and preferably is employed. Using such a tap, the body 10 of the female member is tapped to form threads 14 in the cavity C, which preferably extend substantially all the way to the bottom of the cavity, preferably leaving, however, a narrow unthreaded surface adjacent the marginal edge of the seat to be inserted as presently to be described.

Concurrently with forming the body member 10 and tapping the same, as above described, I also form the separate annular seat member S, see Figs. 6, 7 and 8. This seat member may, as desired, be formed with punch press and coining operations or may be made on a screw machine or otherwise as is found most economical for the material chosen to be used in the seat, and may, if it be "over-worked" as by punching, shearing, machining and/or coining, be thereafter annealed more or less to facilitate its further working and deformation in the steps hereinafter described. In all events the seat S in the forms shown in Figures 6, 7 and 8 will have a central bore B' substantially corresponding to the bore B and preferably of slightly less diameter than the internal diameter of the tube to be coupled. In the first instance, see Figures 6, 7 and the upper half of Figure 8, the seat S preferably has a slightly rounded conical forward surface 20 pitched at least in part at an angle to the axis of the bore somewhat less than the desired finished angle of the seat after the same has been secured within the bottom of the cavity of the female member. For example, if the finished assembled seat is intended to have a true conical surface 21 lying at 45° to the axis of the bore of the coupling, it may in the first instance be formed with at least part of the surface lying at from about 35° to 40° from the axis of the bore B' as shown in the upper part of Fig. 8. Preferably in this form of my invention the conical surface at its forward end terminates in a narrow flat annular radial surface 22. Elimination of the extreme forward tip of the conical surface beyond the flat radial surface 22 does not materially subtract from the surface which actually supports the flared end of the tube and does in the instant invention lend a bearing area useful in effecting the seating of the seat S in the bottom of the cavity of the female member. The seat member S on its opposite or rearward face 23 is dished so that the seat member when first placed in the bottom of the cavity C, as shown in the upper half of Fig. 8, bears essentially on its outer rearward annular corner or edge 24. This edge 24 is preferably cut sharply at the intersection of the dished rearward face 23 with the substantially cylindrical or slightly conical marginal surface 25, which is in turn intersected by the forward surface 20 to form another sharp annular forward marginal edge 26.

As shown in the upper half of Figure 8 I prefer that the pre-formed forward face 20 be flared somewhat toward a radial plane as at 27, where that surface approaches the edge 26, whereby to sharpen the edge 26 and to make the adjacent stock a little more yielding. I also prefer that this face have substantially its finished conical pitch for a limited area adjacent the radial face 22.

Continuing to refer to Figure 8, and particularly the upper half portion thereof, I have shown the seat member S in its pre-seated or bodily dished form disposed in the bottom of the cavity C preliminary to the step through which it is to be seated and secured therein. It will be noted in this preferred form that the lower outer annular corner of the cavity C is shown as being slightly rounded as at 28 adjacent to the lowermost annular edge 24 of the seat S. It will also be seen that one or two of the threads 14 adjacent the bottom of the cavity are shown to be but partially formed, and that preferably a narrow smooth surface 29 is left unthreaded which substantially corresponds to the axial dimension of the marginal surface 25 of the seat. The surface 29 is of substantially cylindrical contour of tap drill diameter or slightly smaller except as its extreme bottom portion may preferably be rounded slightly as at 28 either from design or from the normal consequence of wear of the forward end corner of the tap drill or boring tool which shapes the cavity C. The greatest diameter of the seat S is intended to approach tap drill diameter as closely as practicable for inserting the seat S into the bottom of the cavity without mutilating the threads T during its passage thereinto, and of such diameter as to closely fit within the annular surface 29. When the marginal surface 25 of the seat is slightly conical, as shown, i. e., departing slightly from the true cylindrical surface, the marginal edge 24 will be of slightly less diameter than the edge 26, whereby to assume a position of rest in the first instance on the rounded surface 28 more nearly adjacent the bottom surface 11 of the cavity C than the annular surface 29. In this form also it will be observed that the bottom 11 of the cavity C is dished rearwardly as at 35 in amount considerably less than the "dishing" of the surface 23 of the seat S. When the seat is deformed by being pressed to the right from the position shown in the upper part of Figure 8 to the position shown in the lower part of the figure, the surface 23 of the seat will have been altered from a concave to a slightly convex form bearing upon the dished bottom 11 of the cavity C.

In Figure 8 I have also shown the end of a female die D having an external diameter preferably but slightly less than the tap drill diameter of the cavity C, and having also a forward or working concave conical face 40 whose pitch is substantially that of the final desired pitch of the conical face of the seat. It will also be seen that the female die D preferably also has a radial surface 41 adapted to bear directly on the annular radial surface 22 of the seat S. In the upper portion of Figure 8 the parts are shown in the relationship just prior to the working movement of the die D with respect to the seat S and the body 10 of the female member. It will be understood that the body of the female member is securely held to resist movement of the die D as the die is forcefully moved from right to left as viewed in Figure 8.

The parts being positioned as shown in the upper portion of Figure 8, the die D is forcibly moved relatively to the body 10 of the female member to the right, as viewed, to the position achieved in the bottom portion of Figure 8. The middle central portion of the seat S surrounding the bore B' is advanced rightwardly from the points 50—51 to the points 52—53. In so moving the mid-portion of the seat axially to the right, the marginal portions of the seat are expanded radially and altered more or less from the shape shown in the upper portion of Figure 8 to substantially the shape and position shown in the lower portion. The marginal surface 25, and particularly its sharp marginal edges 24 and 26, are forcibly pressed into the adjacent surfaces 28 and 29 of the body of the female member, forming a fluid-tight joint therewith, and the rearward dished surface 23 of the seat is forcibly pressed into contact with the bottom 11 of the cavity C as shown in the lower portion of Figure 8. As the marginal edge of the seat presses upon the adjacent parts of the body of the cavity, these parts are stressed and tend to maintain inwardly acting radial forces upon the marginal edge of the seat. As indicated above, I prefer that the bottom of the cavity be dished slightly, as at 35, so that the seat is pressed "over-center" with the result that if it has any tendency to spring back from the position shown in the lower half of Figure 8 to the position shown in the upper half, that this tendency will be resisted by the radial forces acting in, around and between the surface 29 of the body and the surface 25 of the seat. It will also be seen that as the die D advances in its stroke that it bears upon an increasing area of the forward pre-formed surface 20 of the seat until at the end of its stroke the divergence between the finished surface 21 of the seat and 40 of the die is substantially eliminated, since at or toward the end of the stroke of the die, substantially the whole of the conical surface 21 is engaged by the die and caused to conform thereto. It will also be seen that the slightly curved surface 28 at the outer bottom edge of the cavity C is forcefully acted upon, particularly by the annular edge 24 of the seat as it is expanded outward due to the change of shape of the seat, and at least some small increment of the metal of one or the other of the members is deformed, displaced and compacted into a fluid-tight joint. In the lower portion of Figure 8 it is not attempted to show the exact displacement of the particular increments of the material where contact, squeezing and sealing pressure and deformation is developed. Neither has it been sought to be shown in particular detail just how the sharp annular edge 26 of the seat engages the wall 29 of the cavity C to displace a portion thereof and/or in turn be more or less crushed or displaced as it is expanded and brought into tight forceful contact therewith. Generally speaking, as the mid-portion of the seat is advanced axially relative to the marginal edges or portion thereof by movement of the die D, the mid-portion of the seat tends to move about the marginal portions thereof as about a plurality of circumferentially spaced and radially expanding centers. In other words the seat as a whole is flattened from its original "dished" shape to a substantially "flat" shape with a consequent increase in its outer diameter and periphery. The mid-portion of the seat adjacent the bore B', having the greater axial mass and strength, tends to maintain its diameter and shape and displaces the marginal portions outwardly into the seal and bond with the adjacent wall 29 of the cavity C as above described.

The rearward surface 23 of the seat as well as the dished bottom of the cavity C are preferably made smooth so that when the parts are pressed into contact, as shown in the lower portion of Figure 8, they will also tend to provide a sealing joint. Even though the seat tends to spring away somewhat from the bottom of the cavity after the pressure of the die is relieved, this tendency to spring away on the one hand will merely increase the pressure between and adjacent the surfaces 25 and 29. On the other hand when the male member is threaded into the female member as shown in Figure 1, and grips the flared end of the tube, the axial components of this threaded gripping force will in turn tend to seat the seat S on the bottom of the cavity, and more particularly will tend to force the surfaces 23 and 11 back into a fluid-tight relationship while the tube is forcefully gripped and coupled between the male and female members.

While I have shown the bottom of the cavity

C to be dished about half as much as the bottom 23 of the seat it will be understood that this showing is merely illustrative. Obviously if the former were dished as deeply as the latter, other things being equal, the peripheral bond between the seat and the body would tend to be lost. For this reason, as I am now advised, I prefer that the extent of "dishing" the bottom of the cavity be no more than a small fraction, about ¼ to ⅓, of the "dishing" of the oppositely disposed face of the seat, depending somewhat upon the nature of the materials of the body and seat. Where, for example, a brass seat is employed with a steel body, the former being relatively softer or less resilient than the latter, I prefer that the dishing of the bottom of the cavity be small since an operable coupling can be made in which the bottom of the cavity is not dished at all. Where a brass seat, for instance, is used with a steel body the smoothness of the surfaces 23 and/or 11 is less important than when harder seats are employed with hard bodies, since softer material such as brass tends to conform to irregularities in the oppositely disposed surface under pressure from the die D in the first instance and under coupling pressure in later instances.

In Figures 9 and 10 I have shown a modified form of my invention in which all the parts are the same as those above described excepting that the rearward face or bottom of the seat S' and the oppositely disposed parts of the bottom 11' of the cavity C' are given a different coacting configuration particularly adjacent their respective bores B and B', whereby to provide a fluid seal near the bore of the finished female member F' in addition to the seal adjacent the surfaces 25 and 29 at the marginal edge of the seat. In this form the bottom surface 11' may be dished as it leaves the outer corner 28 of the cavity C', and then that surface rises to an annular sharp edge 36 adjacent the counterbore 37. The rearward or seating face 23' of the seat S' is provided near the bore B' with an annular conical surface 38 disposed with its mid-portion substantially axially opposite the annular edge 36. With this form of seat and cavity bottom construction, when the die D advances to the right, as shown in Figure 9, from the position indicated in the upper portion of the figure to the position indicated in the lower portion of the figure, the operation and effects may be in all respects substantially the same as that described in relation to Figure 8, excepting that the seat S' instead of bottoming upon a smooth continuous surface, will bottom by contact between the conical surface 38 and the opposite edge 36, whereby to bear up and/or crush the sharp edge more or less, and perhaps also to score or deform somewhat the conical surface 38. While the edge 36 and the conical surface 38 are intended to be formed coaxially of the main axis of the coupling and to contact in a plane normal thereto, substantial departures from geometrical perfection tend to be lost and compensated for as the contacting parts are deformed. In this way a good seal is provided at this point while the seal around the marginal edge of the seat is also established.

It is preferred in this form, as indicated also in respect to the description in the form of Figure 8, that the seat S' be forced "over-center" so that any tendency of the seat to spring back to its original form would be resisted by the radial forces acting between the margin of the seat as at 25 and the juxtaposed wall of the cavity 29, thereby maintaining or tending to maintain a fluid-tight seal in that region also. Even if the contact resulting between the surface 38 and edge 36 as at 39 may not be strictly fluid-tight after the die D has been removed, these parts will, however, be urged to fluid-tight contact when the male member is gripping the flared end of the tube and exerting axial forces therethrough onto the seat S' rightwardly, as viewed in Figure 10, thereby establishing and/or maintaining fluid-tight contact at 39 between the more or less deformed edge 36 and the conical surface 38 when the coupling members firmly engage the flared end of the tube.

In this form of my invention the nature of the inner seal at 39 is such as to permit rather large manufacturing tolerances without impairment of the tightness of the fluid joint at this point, at least when the coupling is in use as above described. For this reason in this form of my invention greater liberality with the dimensional tolerances of the parts contacting at and around the marginal edge of the seat can be enjoyed for at least two reasons. First, if the marginal seal is imperfect as a fluid seal, the utility of the coupling is retained because of the efficacy of the inner seal at 39. Secondly, as shown particularly in the bottom half of Fig. 9, the contact between the outer rearward marginal edge 24 on the seat and the adjacent outer bottom corner 28 of the cavity is substantially a line contact, since the major portions of the surface 23' of the seat and the surface 11' of the bottom of the cavity are out of contact even after the seat has been pressed "home." Thus the pressure exerted by the male member through the flared end of the tube onto the seat not only tends to develop and maintain the inner fluid seal at 39, but also tends to force the seat bodily more deeply into the cavity C, whereby to develop the outer fluid seal, particularly between the edge 24 and the rearward part of the corner 28.

In Figures 11 and 12 I have shown a further modification departing from the forms shown in Figures 1 and 8 in the form of the bottom surface 11" of the cavity C" of the female member F". In this form I prefer to employ the seat S in substantially the same form as described in reference to Fig. 8, and its structure and mode of operation may be substantially the same as therein described except as modified in its coaction with the modified form of the bottom of the cavity. In this form the bottom 11" of the cavity, while dished in its outer portions as at 50 in much the same way as shown in Fig. 8, is formed to rise to an annular ridge 51 presenting a circular line of contact at the peak of such ridge spaced inwardly somewhat from the bore B of the female body. Here as the die D advances from the position shown in the upper portion of Fig. 11 to the position shown in the lower portion of Fig. 11, the seat S is flattened with its outer marginal wall 25 and adjacent edges expanded into tight or substantially tight contact with the oppositely disposed wall 29 near the bottom of the cavity and the corner 28 at the bottom of the cavity, all substantially as described in reference to particularly Figs. 8 and 9 above. The rearward face 23 of the seat S, however, is advanced to bear upon the peak of the annular ridge 51 contacting and flattening the annular peak thereof to a somewhat flattened line contact as at 52, as shown in the lower portion of Fig. 11. As shown the peak of the ridge 51 lies in about the plane of the rearmost part of the corner 28, so that as the seat S is flattened it can be forced "over center" only to about the extent that the peak of the ridge is flattened and/or the contacting portion of the seat is deformed. In this form, however, I prefer that the flattening of the seat by the die D be limited by the ridge 51 to the extent that at least a further increment of marginal expansion or tendency to expand will await the threaded coaction of the male and female members while forcibly gripping the flared end of the tube. At such time the fluid seal at 52 will also be finally established or augmented. In this form the machining of the bottom of the cavity of the female member is somewhat simplified compared to the form in Figs. 9 and 10, and a little less material is removed from this surface as compared with the forms shown in Figs. 1 and 8.

It will be seen that according to the practice of my invention one is afforded a wide choice of materials, including particularly a choice of materials difficult to machine from which to make the body of the female member. In this way I may avail myself of the advantages of economy as by the use of steel, while minimizing the r'sk of loss and expense incident to tapping the cavity C in the presence of the conical seat. Likewise I may choose various other materials difficult to machine such as Monel metal or Tobin bronze for the specific utility of such metals with similar advantages in the cost of the machining and other manufacturing operations. The material of the seat need not necessarily be the same as the material of the body of the female member. Neither must it necessarily be harder or softer than the material of the body with which it is brought into forcible contact, since the relative hardness and shape of the parts which bear in the more or less sharp edged contact will merely determine which of the materials yields the most. So long as there is the expanding of the seat into a gripping relation with the female body and a yielding or pressing of the weaker part in contact with the stronger, whether wholly or partly by virtue of inherent strength or by shape or both, the mechanical bond and fluid seal which I desire will be brought about.

Although I have shown the surface 29 as wholly smooth and devoid of threads as a preferred form, I contemplate that much of this surface may be contacted by the tap, and as less of this surface is left truly smooth and/or cylindrical, then correspondingly I prefer that the marginal surface 25 of the seats S and S' be formed more nearly cylindrical in the first instance, whereby to increase the diameter of the rear edges 24 relative to the front edges 26 and correspondingly increase the burden of the sealing relationship upon the juxtaposed portions of the seat and body more closely adjacent the bottom of the cavity.

In the use of couplings of the general type herein referred to, it is found that irregularities in the tube being coupled or in the flaring of the tube or otherwise, often bring about a resolution of forces during the coupling operation which tend to distort the seat in various ways such as distorting the conical surface as by moving the apex of the projected cone out of the axis of the bore of the coupling. If the seat is unyielding to such forces, its sealing relation to the flared end of the tube is somewhat impaired, and occasionally the flared end of the tube is split or otherwise injuriously affected. It is thus often useful to provide a seat that is capable of "giving" or yielding while retaining in the body portion of the coupling characteristics of strength or otherwise inconsistent with the yielding characteristic desired in the material of the seat. For example, a relatively soft brass seat in a steel body provides this specific advantage while retaining the other advantages incident to my invention herein described.

While I have described certain preferred and modified forms of my invention, other modifications and changes will occur to those skilled in the art without departing from the spirit thereof, and I do not care to be limited to the particular forms herein shown or in any manner other than by the claims appended hereto when construed with the range of equivalents to which they are entitled in view of my advance from the state of the prior art.

I claim:

1. A coupling member of the inverted seat type having a cavity with an annular side wall and a bottom surface and a separately formed seat member radially expanded in the bottom of said cavity in engagement with said bottom surface and the bottom part of said side wall, said seat member maintaining in the absence of other coupling parts a fixed stressed engagement with the side wall of said cavity and a fluid sealing relation with the said bottom surface of said cavity.

2. A female tube coupling member of the inverted seat type having an internally threaded cavity with a bore and a bottom dished to provide a sealing surface about the bore and a separately formed conical seat disposed and self-secured in the bottom thereof with at least part of its conical surface lying radially opposite the threads of said cavity, the marginal edge of said seat being at least in stressed mechanical engagement with the adjacent wall of said cavity, said seat and said member having substantially coaxial central bores, said seat also having a sealing surface held in stressed sealing relation with said sealing surface in said bottom of said member adjacent said bores, said seat in its secured relation to said member being in a state of self-sustaining radial expansion maintaining said engagement and sealing relation in the absence of the tube to be coupled or other coupling parts.

3. A tube coupling member of the inverted seat type comprising a body member having a central bore and a tube receiving cavity, the bottom of which is centrally apertured by said bore, and a separately formed centrally apertured seat disposed in said cavity having a forward conical surface to receive the flared end of the tube to be coupled, said seat having a sharp marginal edge disposed oppositely of said conical surface expanded in situ into a fluid-tight bond with said cavity and radially stressing the engaged wall of said cavity at the bottom thereof, said seat after having been expanded remaining in a state of self-sustaining expansion maintaining said bond.

4. The method of making a female coupling member of the inverted seat type which consists in forming a body member with a substantially right cylindrical cavity, threading the walls of said cavity to a point closely adjacent the bottom thereof, forming a separate seat member having a dished bottom and a disproportionately convex top and having its marginal diameter closely approaching the internal diameter of the unthreaded portion of said cavity, inserting said seat member into said cavity to the bottom thereof, and forcibly pressing at least the mid-portion of said seat member in the direction toward the bottom of said cavity to flatten the bottom of said seat member and give conical form to the top of said seat member and spread the marginal portion thereof into radial engagement with the adjacent wall of said cavity.

5. The method of making a tube coupling of the inverted seat type which consists in forming a body member with a cavity having an annular side wall and having a substantially non-reentrant bottom surface, threading said side wall substantially to the bottom thereof, forming a separate seat member with a thickened central portion and a dished bottom surface, inserting said seat member into the cavity of said body member adjacent the bottom of said cavity, and forcefully displacing the mid-portion of said seat member axially with respect to the marginal portions thereof while permitting said marginal portions to yield radially outward into engagement with the radially adjacent wall of said cavity, while constraining the said thickened central portion of said seat member to take a substantially conical form rising from said threaded wall to a central apex in the radial zone of said threads.

6. The method of making a female coupling member of the inverted seat type which consists in forming a body member with a cavity having a threaded side wall and a central bore piercing the bottom of said cavity, forming the bottom of said cavity to have a limited sealing area between said bore and the side wall of said cavity, forming a separate apertured dished seat member with a thickened central part having its marginal diameter approaching the internal diameter of said cavity and having a sealing area juxtaposed to the sealing area of the said bottom of said cavity, and having a convex face opposite said sealing area, inserting said seat member into said cavity with its bottom marginal edge bearing on the bottom of said cavity and with said sealing areas axially spaced apart, and forcibly pressing at least the mid-portion of said seat member in the direction toward the bottom of said cavity to expand the marginal portion of said seat into radial engagement with the adjacent wall of said cavity and bring said sealing areas into forcible contact while constraining the said thickened central part of said seat member to take finished substantially tapered form rising into the threaded portion of said cavity radially opposite the threaded wall thereof.

7. A coupling member as described in claim 1 in which the said annular side wall of said cavity is threaded substantially to the bottom part thereof which is engaged by said seat member, and in which said seat member is thicker in its mid-portion than at its periphery and has a substantially conical tube receiving surface rising into said cavity.

HENRY D. STECHER.